(12) United States Patent
Woolworth et al.

(10) Patent No.: US 11,707,050 B2
(45) Date of Patent: Jul. 25, 2023

(54) POLY TAPE ACCESSORY FOR ELECTRIC FENCE HANDLE, ELECTRIC FENCE GATE HANDLE WITH POLY TAPE ACCESSORY AND METHOD OF SECURING POLY TAPE TO ELECTRIC FENCE GATE HANDLE USING POLY TAPE ACCESSORY

(71) Applicant: WOODSTREAM CORPORATION, Lititz, PA (US)

(72) Inventors: Andrew Baker Woolworth, Lancaster, PA (US); Chad Eugene Spangler, Palmyra, PA (US); Marko K. Lubic, Shillington, PA (US)

(73) Assignee: Woodstream Corporation, Lancaster, PA (US)

( * ) Notice: Subject to any disclaimer, the term of this patent is extended or adjusted under 35 U.S.C. 154(b) by 1400 days.

(21) Appl. No.: 16/045,290

(22) Filed: Jul. 25, 2018

(65) Prior Publication Data

US 2019/0037802 A1    Feb. 7, 2019

Related U.S. Application Data

(60) Provisional application No. 62/540,306, filed on Aug. 2, 2017.

(51) Int. Cl.
*A01K 3/00*    (2006.01)
*A01K 1/00*    (2006.01)

(52) U.S. Cl.
CPC .............. *A01K 3/006* (2021.08); *A01K 1/0017* (2013.01)

(58) Field of Classification Search
CPC .......... A44B 11/02; A44B 11/04; A44B 11/18; A44B 11/2553; A44B 11/25; A01K 1/0017; A01K 3/005
See application file for complete search history.

(56) References Cited

U.S. PATENT DOCUMENTS 2,278,153 A * 3/1942 Shaulson ............... A44B 11/04
24/200
2,285,714 A * 6/1942 Hirsh ..................... A44B 11/04
24/198

(Continued)

FOREIGN PATENT DOCUMENTS

CN        102823508 A    12/2012
CN        103174717 A     6/2013

(Continued)

OTHER PUBLICATIONS

Chinese Office Action and translation, dated Jan. 2, 2020, 28 pages.

(Continued)

*Primary Examiner* — Daniel J Wiley
(74) *Attorney, Agent, or Firm* — Barley Snyder

(57) ABSTRACT

A poly tape accessory for an electric fence gate handle, the combination of the poly tape accessory and an electric fence gate handle configured to accommodate the poly tape accessory, and a method of securing the poly tape to the accessory is provided. The accessory is electrically conductive and includes a neck and a head with a plurality of slots through which the poly tape is woven to secure the poly tape while retaining adjustability. The neck of the accessory has a locating feature and a locking tab by which the accessory can be removably coupled to an electric fence gate handle through a quarter-turn motion of the accessory relative to the gate handle without the need for any tools.

17 Claims, 11 Drawing Sheets

(56) References Cited

U.S. PATENT DOCUMENTS

| | | | | |
|---|---|---|---|---|
| 2,293,562 | A * | 8/1942 | Rosenthal | A44B 11/04 24/200 |
| 2,302,341 | A * | 11/1942 | Nash | A41F 11/04 24/114.12 |
| 3,161,931 | A * | 12/1964 | Zif | A44B 11/04 24/200 |
| 3,222,745 | A * | 12/1965 | Palmleaf | B65D 63/16 24/910 |
| 3,672,007 | A * | 6/1972 | Steinberg | A44B 11/12 24/196 |
| 4,040,604 | A | 8/1977 | Langlie et al. | |
| 4,484,379 | A * | 11/1984 | Appelt | A44B 11/14 24/197 |
| 4,941,434 | A * | 7/1990 | Ellwanger | B60R 22/10 24/129 B |
| 6,257,558 | B1 | 7/2001 | Levine et al. | |
| 7,566,047 | B2 * | 7/2009 | Wall | A01K 3/00 256/48 |
| 2005/0066484 | A1 * | 3/2005 | Hurn | A44B 11/04 24/321 |
| 2014/0338157 | A1 * | 11/2014 | Iannello | A44B 13/0029 24/318 |

FOREIGN PATENT DOCUMENTS

| | | |
|---|---|---|
| CN | 204828199 U | 12/2015 |
| DE | 102006010765 | 9/2007 |
| WO | WO 2013/187779 | 12/2013 |

OTHER PUBLICATIONS

British Examination Report, dated May 28, 2020, 2 pages.
Abstract of CN 102823508, dated Dec. 19, 2012, 1 page.
Abstract of CN 103174717, dated Jun. 26, 2013, 2 pages.
Abstract of CN 204828199, dated Dec. 12, 2015, 1 page.

* cited by examiner

POLY TAPE ACCESSORY FOR ELECTRIC
FENCE HANDLE, ELECTRIC FENCE GATE
HANDLE WITH POLY TAPE ACCESSORY
AND METHOD OF SECURING POLY TAPE
TO ELECTRIC FENCE GATE HANDLE
USING POLY TAPE ACCESSORY

This application claims the priority of U.S. Provisional Ser. No. 62/540,306, filed Aug. 2, 2017.

BACKGROUND OF THE INVENTION

Field of the Invention

The present invention is related to the field of electric fencing and, more particularly, to an accessory for securing poly tape to an electric fence gate handle and method therefor.

Description of the Related Art

Electrically conductive poly tape is one form of barrier used in constructing electric fencing. To assist users in installing an electric fence with poly tape, a need exists for a user-friendly and inexpensive way of securing the poly tape to the gate handle without the need for any tools while also enabling the poly tape connection to be removed so that the gate handle can accommodate other styles of electric fencing.

SUMMARY OF THE INVENTION

In view of the foregoing, the present invention is directed to a poly tape accessory for an electric fence gate handle, the combination of the poly tape accessory and an electric fence gate handle configured to accommodate the poly tape accessory, and a method of securing the poly tape to the accessory.

The poly tape accessory includes a generally planar head with a substantially rectangular perimeter and a narrowed neck having a locating feature and a locking tab. The head has three cutouts or slots formed therein that include two generally rectangular slots that are "closed" or enclosed on all four sides by the perimeter of the head, and a third generally rectangular "open" slot that is enclosed on three sides by the head perimeter but open on the fourth side. The locating feature on the neck is embodied as a boss with a projecting end that is configured to be inserted through a complementary elongated hole in the connecting arm of an electric fence gate handle and locked in place through a quarter-turn rotation of the accessory relative to the gate handle. The rotated orientation is secured by the locking tab on the accessory which has a generally U-shaped arm that forms an open-sided channel. The connecting arm is received within the channel when the accessory is rotated the quarter turn to prevent relative lateral movement between the accessory and the gate handle.

The combination of the electric fence gate handle and the poly tape accessory includes the foregoing poly tape accessory and an electric fence gate handle having a fence closure end and a poly tape connecting end. The fence closure end has a conventional hook for securing the gate handle to the fence when the electric fence gate is closed. The poly tape connecting end of the gate handle has a connecting arm with an elongated opening. The projecting end of the boss on the neck of the accessory has a T-shaped head that fits through the elongated opening on the gate handle connecting arm when aligned in a first orientation. Upon thereafter rotating the accessory a quarter-turn to a second orientation, the T-shaped head extends transversely to the elongated opening such that the projecting end of the boss cannot be pulled back through the gate handle connecting arm opening. Rotation to the second orientation also secures the gate handle connecting arm within the U-shaped channel formed by the tab arm on the accessory to prevent relative lateral movement between the gate handle and the accessory.

The method of securing the poly tape to the accessory according to the present invention includes the steps of weaving the poly tape through the three slots in the accessory head. The free end of the poly tape is brought up through the first closed slot, and then looped back down through the second closed slot which is adjacent to the first slot so that the poly tape is folded back upon itself to effectively form two overlapping sections. Both sections of the poly tape are then brought-into the third slot through the open side thereof which serves to lock the poly tape and prevent it from pulling back out of the accessory while also allowing the overlap in the poly tape sections to be adjusted to remove any excess slack in the fencing.

Accordingly, it is an object of the present invention to provide an accessory for an electric fence gate handle that has a locating feature configured to be connected with a complementary structure on the fence gate handle and then rotated a quarter-turn to lock the accessory to the fence gate handle.

Another object of the present invention is to provide an accessory for an electric fence gate handle in accordance with the preceding object in which the locating feature is embodied as a boss with a projecting end that is configured to be inserted through a complementary elongated hole in the connecting arm of an electric fence gate handle.

A further object of the present invention is to provide an accessory for an electric fence gate handle in accordance with the preceding objects in which the accessory is locked to the gate handle connecting arm by a locking tab on the accessory that has a generally U-shaped arm that forms an open-sided channel into which the gate handle connecting arm is at least partly received upon the quarter-turn rotation of the accessory to restrain relative lateral movement between the accessory and the gate handle.

Yet a further object of the present invention is to provide an accessory for an electric fence gate handle in accordance with the preceding objects in combination with an electric fence gate handle having a fence closure end and a poly tape connecting end, the poly tape connecting end having a connecting arm with the elongated hole or opening that receives the projecting end of the accessory boss when aligned in a first orientation.

Another object of the present invention is to provide the combination of an accessory for an electric fence gate handle and the electric fence gate handle in accordance with the preceding object in which the projecting end of the accessory boss has a T-shaped head that fits through the elongated opening on the handle arm in the first orientation but, upon rotating the accessory a quarter-turn to a second orientation, the T-shaped head extends transversely to the elongated opening such that the head of the boss cannot be pulled back through the opening in the gate handle connecting arm.

Still another object of the present invention is to provide a method for securing a length of electrically conductive poly tape used in electric fencing to an accessory for an electric fence gate handle, the accessory having a head with first and second generally rectangular closed slots and a third generally rectangular open slot and the method including the steps of weaving the poly tape through the slots in the accessory head.

A further object of the present invention is to provide a method in accordance with the preceding object in which the free end of the poly tape is brought up through the first slot, looped back down through the second slot which is adjacent to the first slot so as to be folded back upon itself to form two overlapping sections, and then both sections of the poly tape are brought into the third slot through the open side thereof which serves to lock the poly tape and prevent it from pulling back out of the accessory while also allowing the overlap in the poly tape sections to be adjusted to remove any excess slack in the fencing in order to keep the fence taut.

A still further object of the present invention is to provide a poly tape electric fence gate handle accessory in accordance with the preceding objects that is user-friendly, inexpensive and easily installable and removable without tools.

Yet a further object of the present invention is to provide a poly tape electric fence gate handle accessory in accordance with the preceding objects that is compatible with poly tapes ranging from 0.500" to 2.000" in width.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
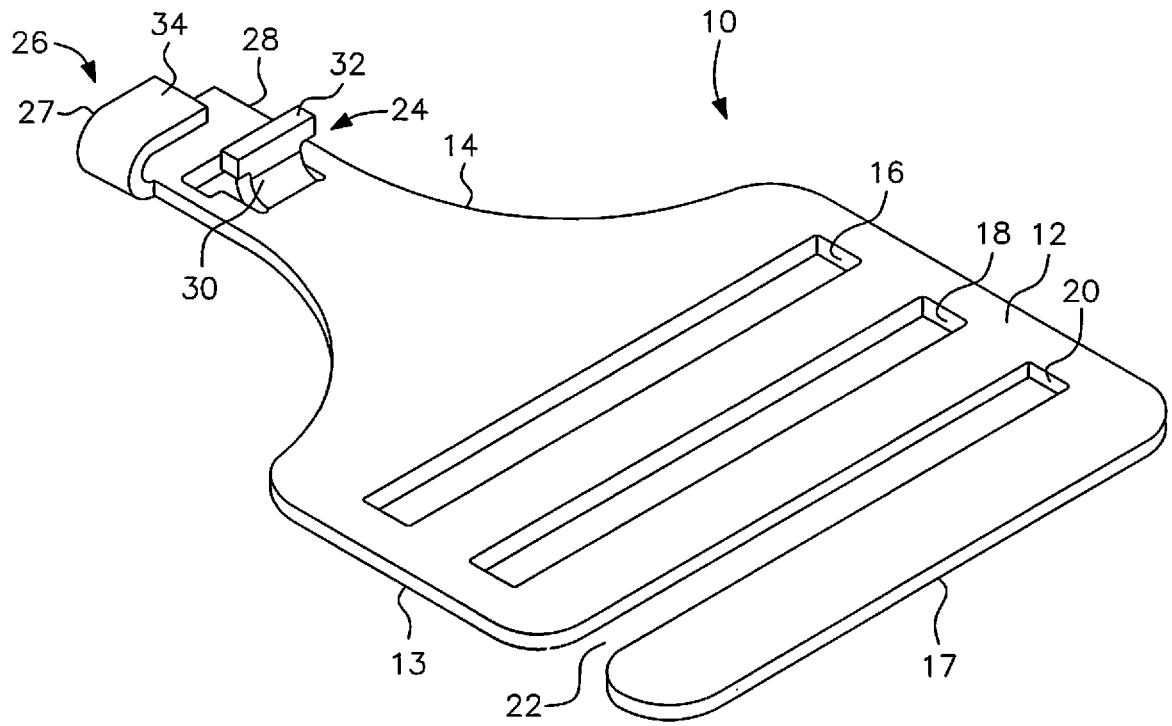
FIG. 1 is a perspective view of a poly tape electric fence gate handle accessory in accordance with the present invention.
Figure 2:
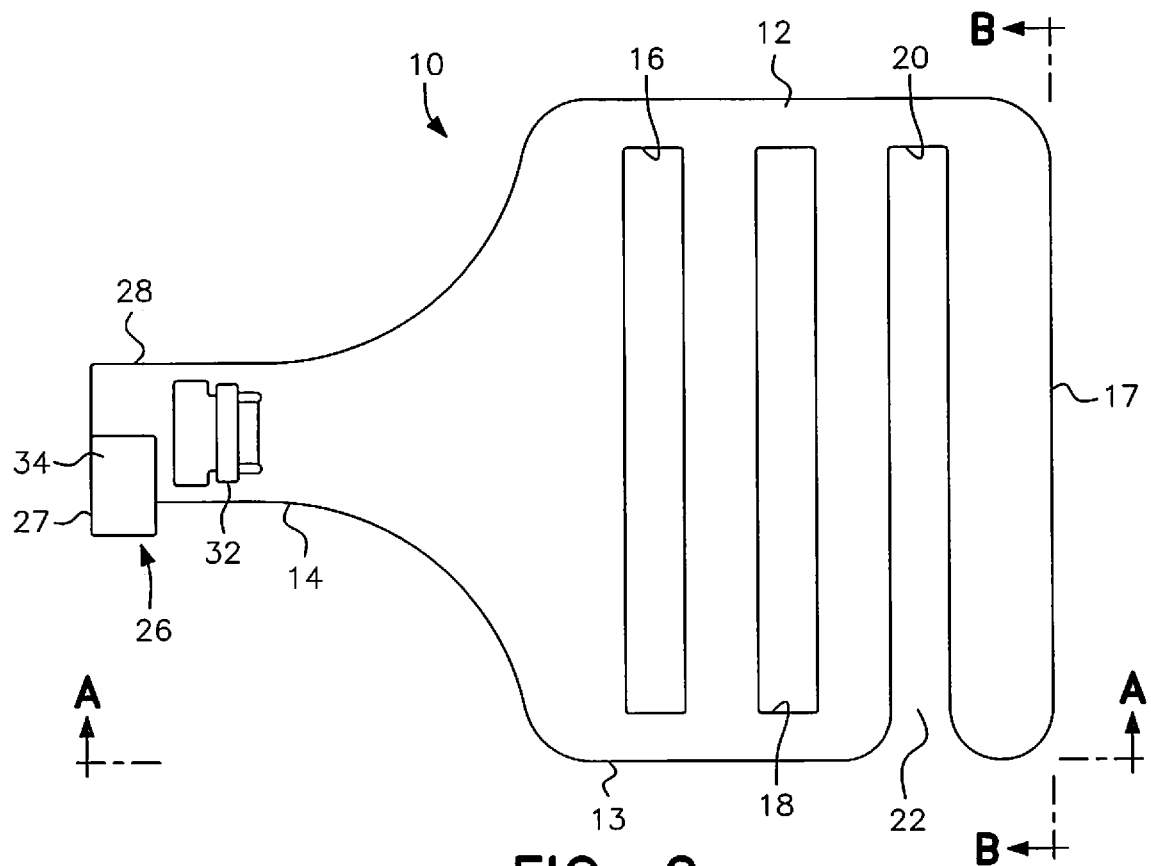
FIG. 2 is a plan view of the poly tape electric fence gate handle accessory shown in FIG. 1.
Figure 3:
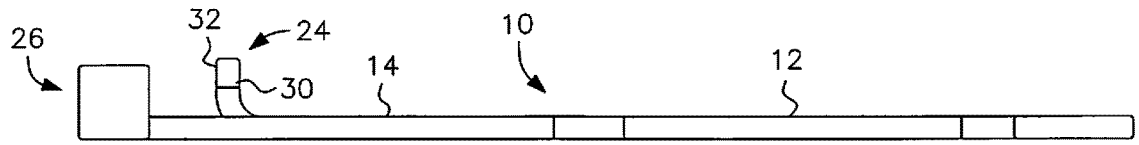
FIG. 3 is a side view of the poly tape electric fence gate handle accessory taken along line A-A of FIG. 2.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIGS. 1-4, the present invention is directed to a poly tape accessory generally designated by reference numeral 10. The accessory 10 includes a head 12 and a neck 14. As used herein, the neck is at the proximal end of the accessory, being so identified with respect to its proximity to the gate handle to which the accessory is to be connected, while the opposite end of the accessory is identified as the distal end of the accessory. According to the embodiment shown, the accessory is about 3.75" long and 2.5" wide, with a thickness of about 0.078".

The head 12 is generally planar with preferably a substantially rectangular perimeter 13 and has a plurality of cutouts generally designated by reference numeral 14 that form slots that are used to secure the accessory to a length of electrically conductive poly tape used in electric fencing. The cutouts 14 are preferably generally rectangular, with a length that extends substantially parallel with the distal end face 17 of the head, and preferably include a first closed slot 16, a second closed slot 18, and a third open slot 20. The "closed" slots are enclosed on all four sides by the head perimeter 13 while the "open" slot 20, which is nearest the distal end, is enclosed on three sides but has an open fourth side 22. The closed slots are preferably about 2.125" in length, while the open slot is somewhat longer due to the open side 22. All of the slots preferably have a width of about 0.200". The accessory 10 is made of an electrically conductive material such as sheet metal, stamped/formed steel, laser cut steel and the like, with an electrically conductive protective plating such as bright zinc, hot dip zinc galvanized, aluminized, dacromet, geomet, nickel, etc, or any other suitable electrically conductive material known to those skilled in the art.

The neck 14 includes a locating feature generally designated by reference numeral 24 and a locking tab generally designated by reference numeral 26 positioned proximal to the locating feature. The locating feature 24 is embodied as a projecting boss 30 with a T-shaped head 32. The T-shaped head 32 is configured to be inserted through a complementary elongated hole in the connecting arm of an electric fence gate handle as will be described hereinafter.

Figure 4:
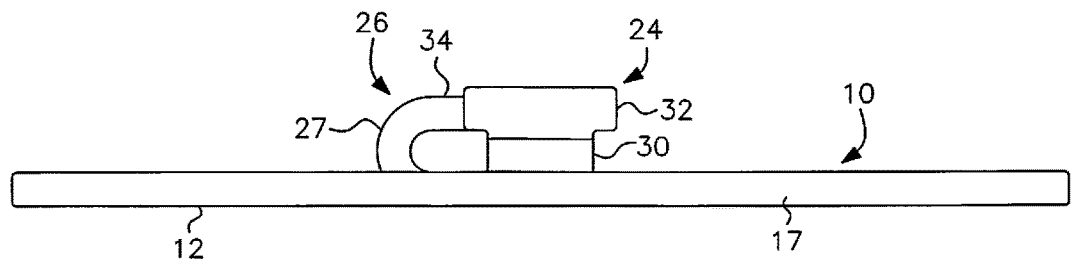
FIG. 4 is an end view of the poly tape electric fence gate handle accessory taken along line B-B of FIG. 2.

The locking tab 26 has a generally U-shaped arm 27 with a free end 34 that extends above and generally parallel with a base 28 of the neck so that the free end 34 of the arm 27 and the neck base 28 form an open-sided channel 36 (see FIG. 4).

Figure 5:
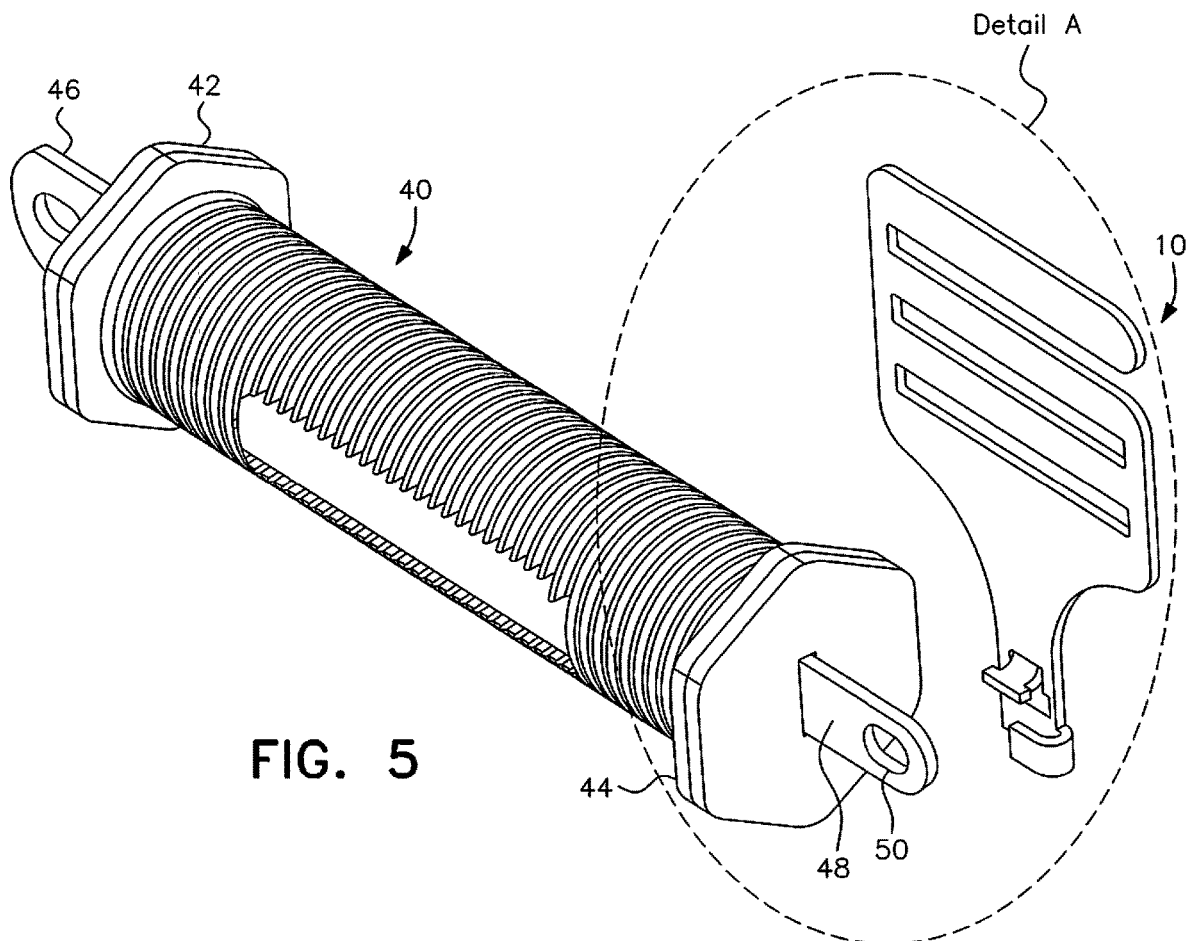
FIG. 5 is a perspective view of an electric fence gate handle configured for use in combination with the poly tape electric fence gate handle accessory, the accessory being positioned for coupling therewith in accordance with the present invention.

As shown in FIG. 5, the accessory 10 is configured to be coupled with an electric fence gate handle generally designated by reference numeral 40. The electric fence gate handle 40 has a fence closure end 42 and a poly tape connecting end 44. The fence closure end 42 has a conventional hook 46 for securing the gate handle 40 to the fence (not shown) when the electric fence gate (not shown) is closed as during use of the fence.

Figure 5A:
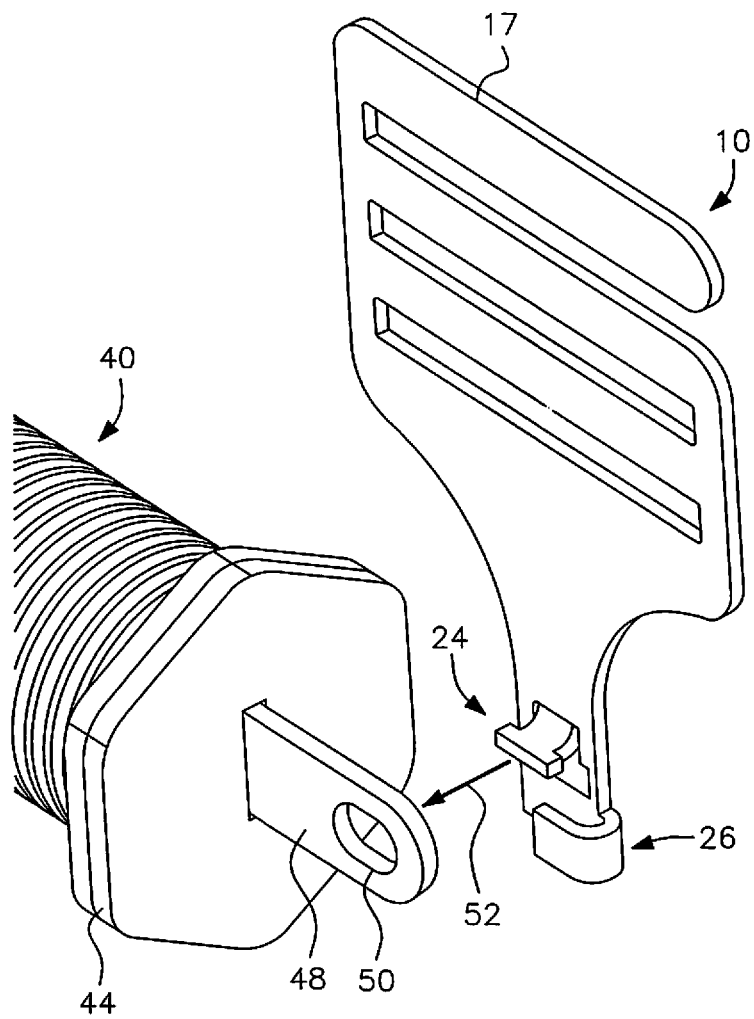
FIG. 5A is an enlarged perspective view of Detail A shown in FIG. 5.
Figure 5B:
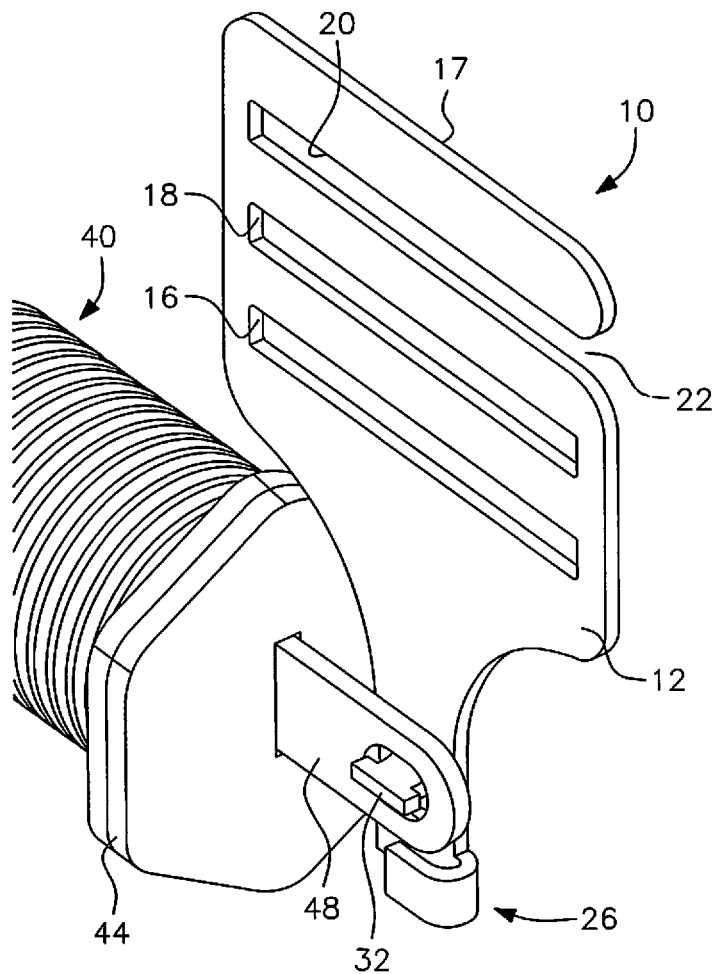
FIG. 5B is a perspective view showing the accessory coupled to the gate handle in the first orientation after the accessory has been moved in the direction of the arrow shown in FIG. 5A to insert the projecting end of the locating feature boss into the gate handle connecting arm opening.
Figure 6:
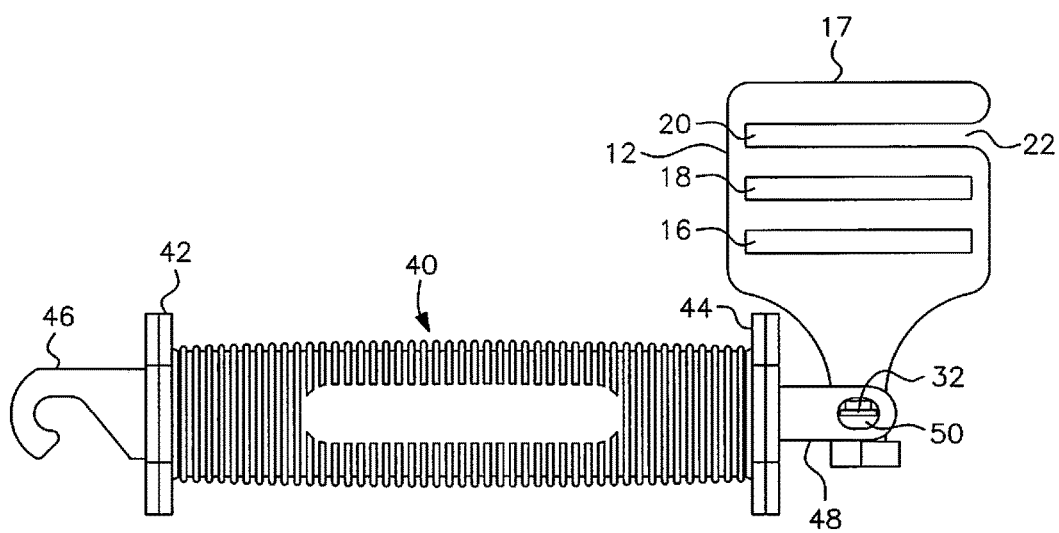
FIG. 6 is a side view of the handle and accessory coupled in the first orientation as shown in FIG. 5B.

The poly tape connecting end 44 has a connecting arm 48 with an elongated opening 50. The opening 50 has a specific geometry corresponding with that of commercially available gate handle part number F14019 from Woodstream Corporation. As indicated by the arrow 52 in FIG. 5A, when the accessory and the gate handle are properly aligned, the T-shaped head 32 on the projecting end of the boss 30 on the neck 14 of the accessory 10 is configured to be inserted through the elongated opening 50 on the gate handle connecting arm 48 to be coupled in a first orientation as shown in FIGS. 5B and 6.

Figure 7:
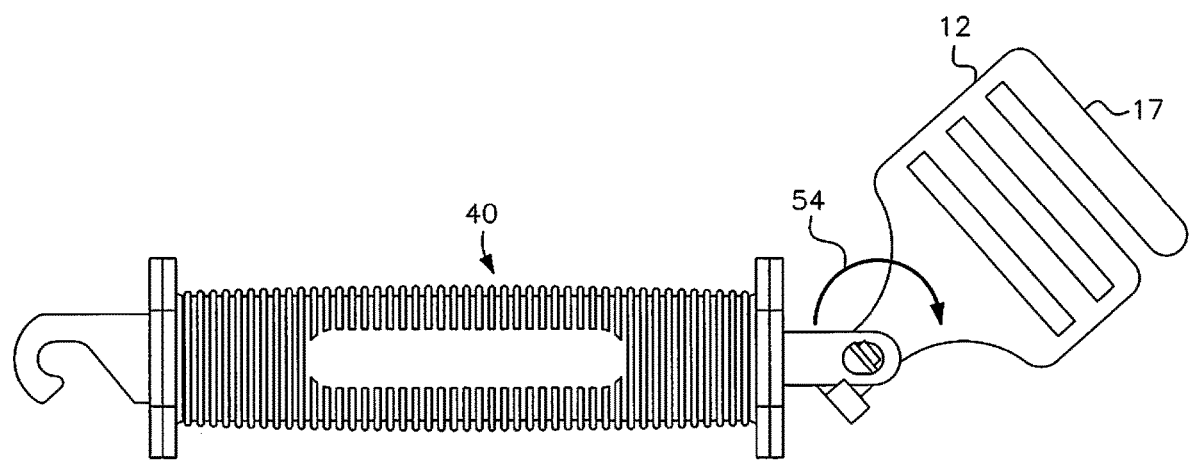
FIG. 7 is a side view showing the direction of the quarter-turn rotation toward the second orientation that will secure the coupling of the accessory to the connecting arm of the gate handle.

To secure the accessory 10 to the gate handle 40, the accessory is then rotated a quarter-turn, in the clockwise direction of arrow 54 shown in FIG. 7, to a second orientation shown in FIGS. 8-11. In the second orientation, the T-shaped head 32 extends transversely to the elongated opening 50 such that the head 32 of the boss 30 cannot be pulled back through the opening 50 in the gate handle connecting arm 48.

Rotation to the second orientation also secures the gate handle connecting arm 48 within the U-shaped channel 36 formed by the arm 27 of locking tab 26 on the neck 14 of the accessory 10 to restrict relative lateral movement between the gate handle and the accessory.

Figure 8:
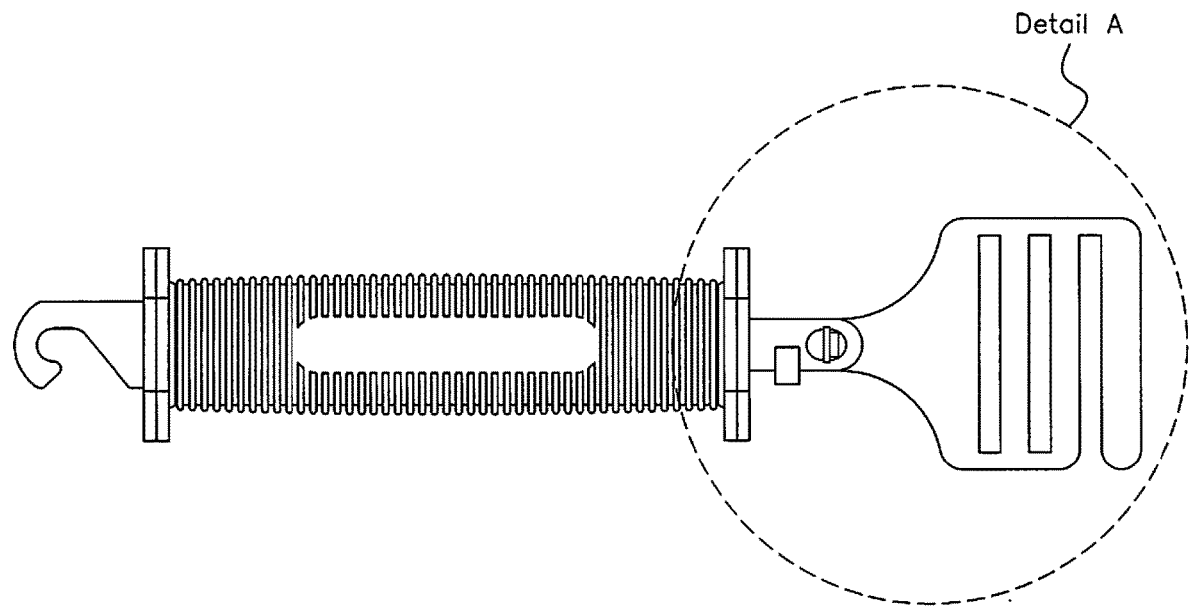
FIG. 8 is a side view of the completed quarter-turn as progressing in FIG. 7 with the connecting arm having been received within the channel formed by the arm of the accessory locking tab to secure the installation of the accessory to the gate handle.
Figure 8A:
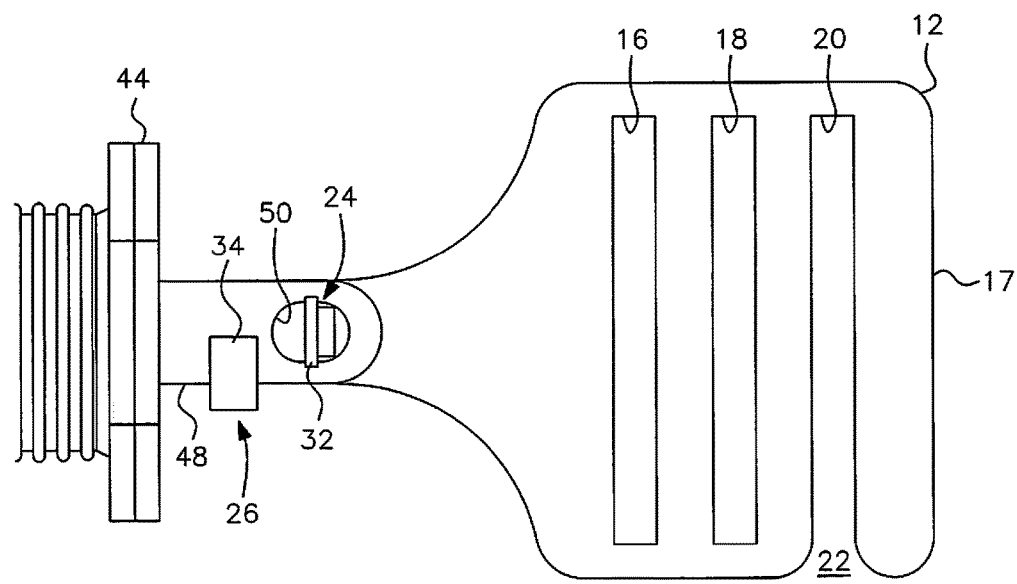
FIG. 8A is an enlarged side view of Detail A shown in FIG. 8.
Figure 8B:
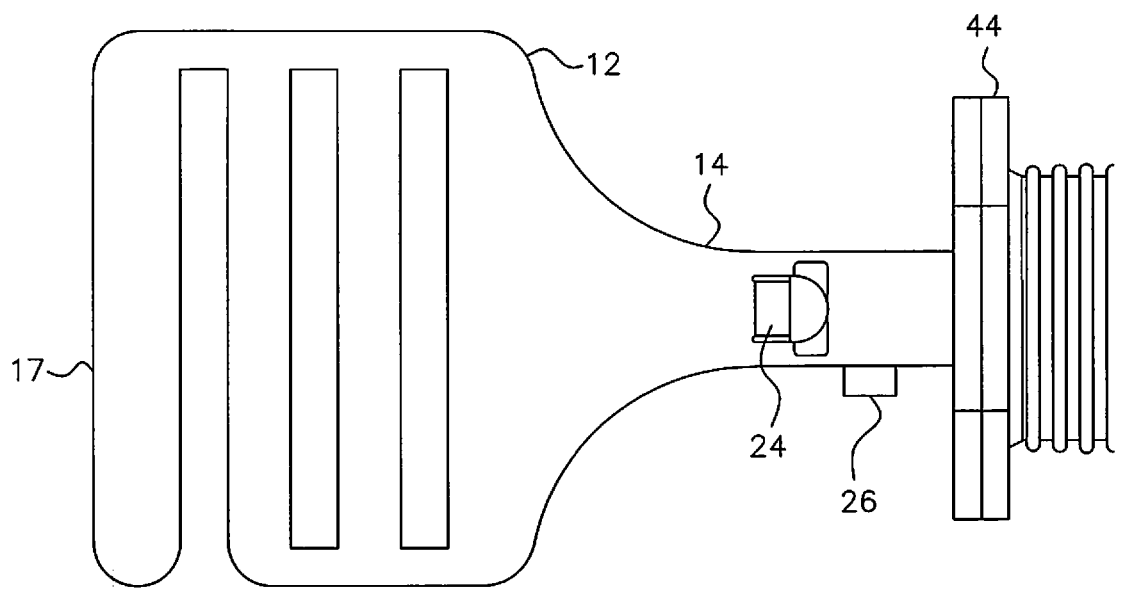
FIG. 8B is an opposite side view of the installed accessory shown in FIG. 8A.
Figure 9:
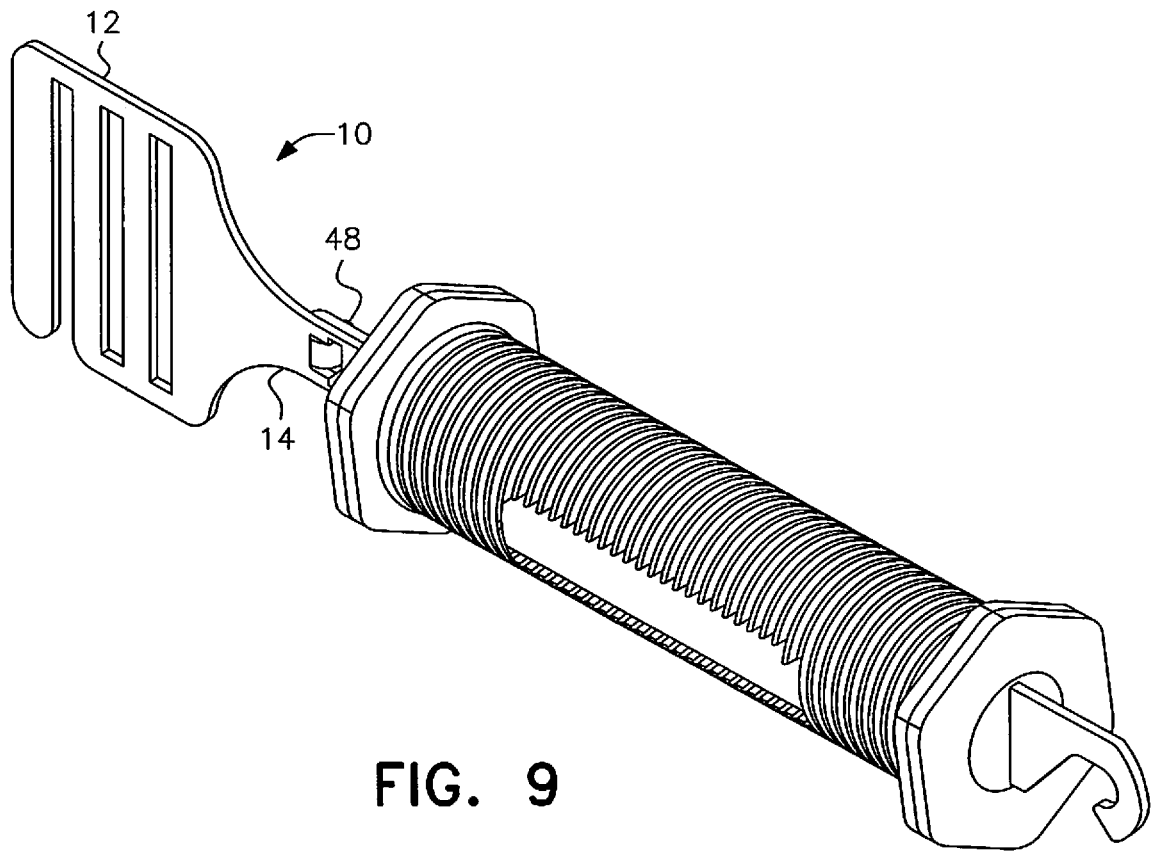
FIG. 9 is a perspective view of the accessory installed on the fence gate handle as shown in FIG. 8.
Figure 10:
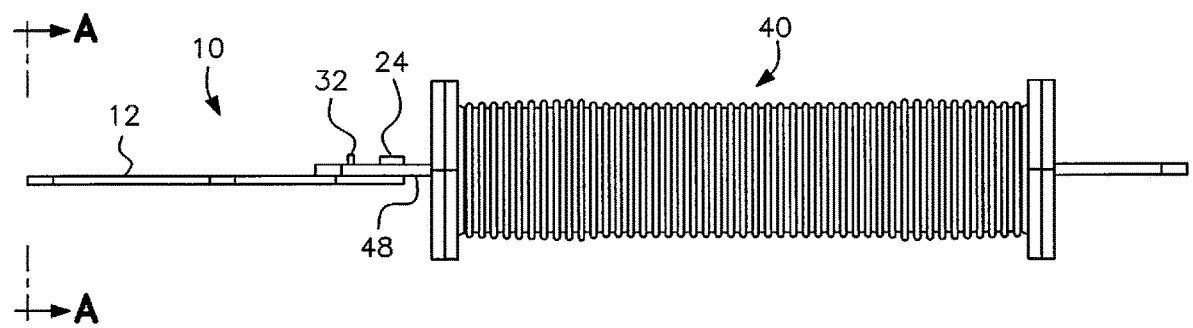
FIG. 10 is a top view of the installed accessory shown in FIG. 9.
Figure 11:
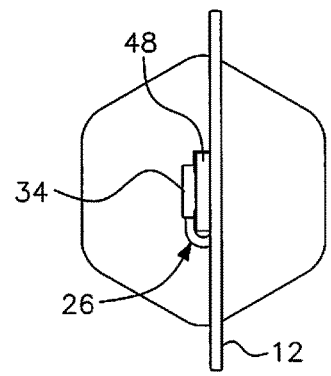
FIG. 11 is an end view taken along line A-A of FIG. 10.

The poly tape accessory may also be easily removed from the gate handle by reversing the quarter-turn motion to rotate the accessory in a counter-clockwise direction with reference to the assembled orientation shown in FIG. 8. By removing the accessory, the gate handle can accommodate other styles of electric fencing such as wire, poly wire, poly rope and the like. The user also has the option of making the accessory installation permanent with the use of a crimping hand tool as would be understood by persons of ordinary skill in the art.

Figure 12:
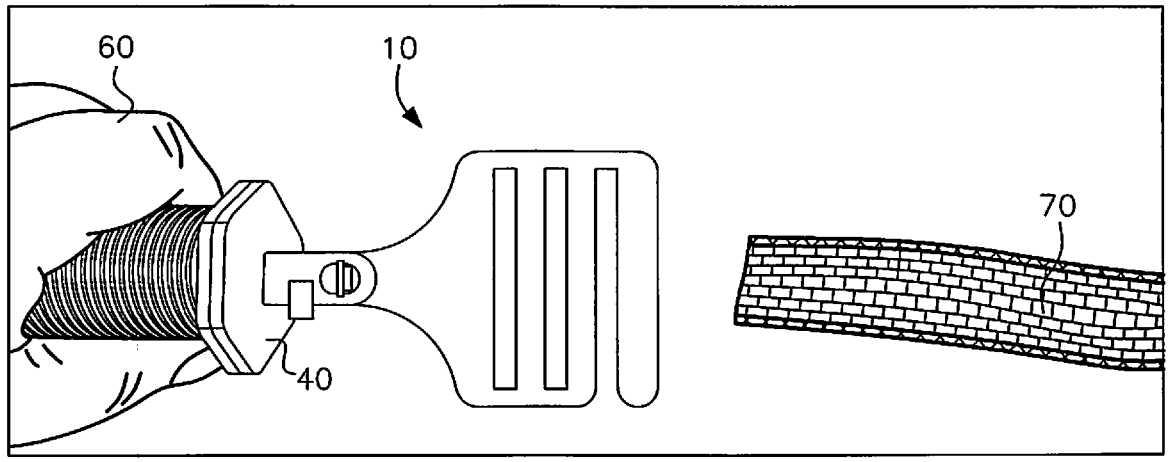
FIG. 12 is a photograph of a user holding a fence gate handle with the accessory installed thereon and the free end of a poly tape to be secured to the accessory.

FIG. 12 is a photograph of an accessory 10 coupled to a fence gate handle 40 as held by a user 60 and a length of poly tape 70 to be secured to the accessory. The steps of weaving the poly tape through the slots 16, 18, 20 in the head 12 to secure the poly tape 70 to the accessory 10 are shown in the subsequent photographs of FIGS. 12A-12E.

Figure 12A:
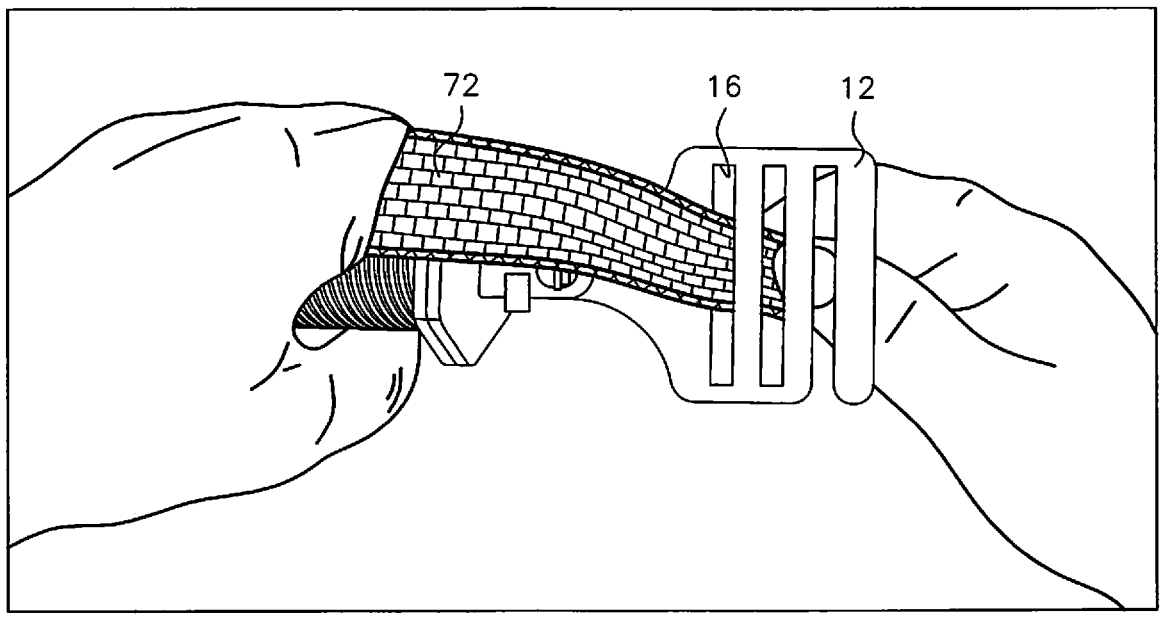
FIG. 12A shows the first step of the method of securing the poly tape to the electric fence gate handle accessory shown in FIG. 12, in which the poly tape is brought up through the first closed slot according to the present invention.
Figure 12B:
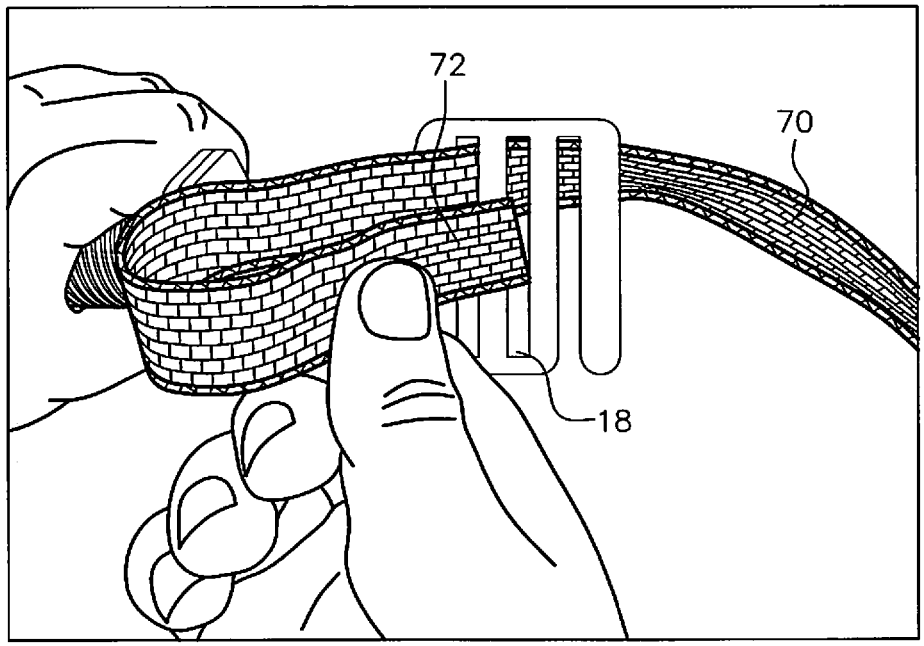
FIG. 12B shows the second step of the method following FIG. 12A, in which the poly tape is looped back through the second closed slot according to the present invention.
Figure 12C:
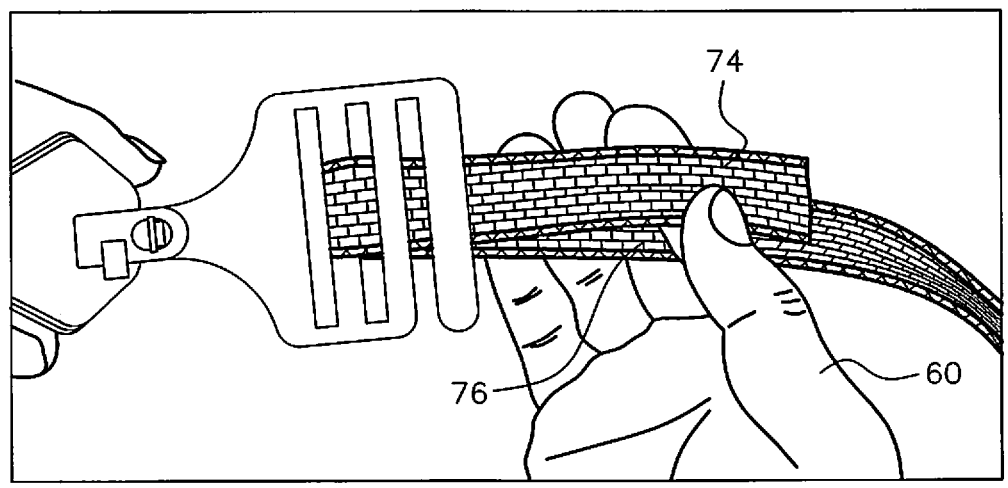
FIG. 12C shows the third step of the method following FIG. 12B, in which the looped poly tape end is folded back upon itself to form two overlapped sections according to the present invention.
Figure 12D:
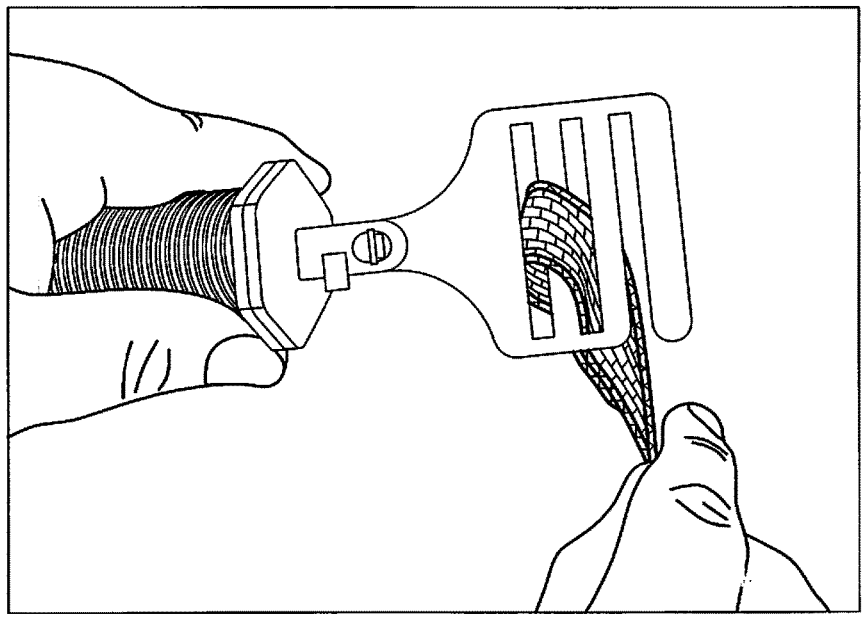
FIG. 12D shows the fourth step of the method following FIG. 12C, in which both sections of the poly tape are brought into the third slot through the open side thereof according to the present invention.
Figure 12E:
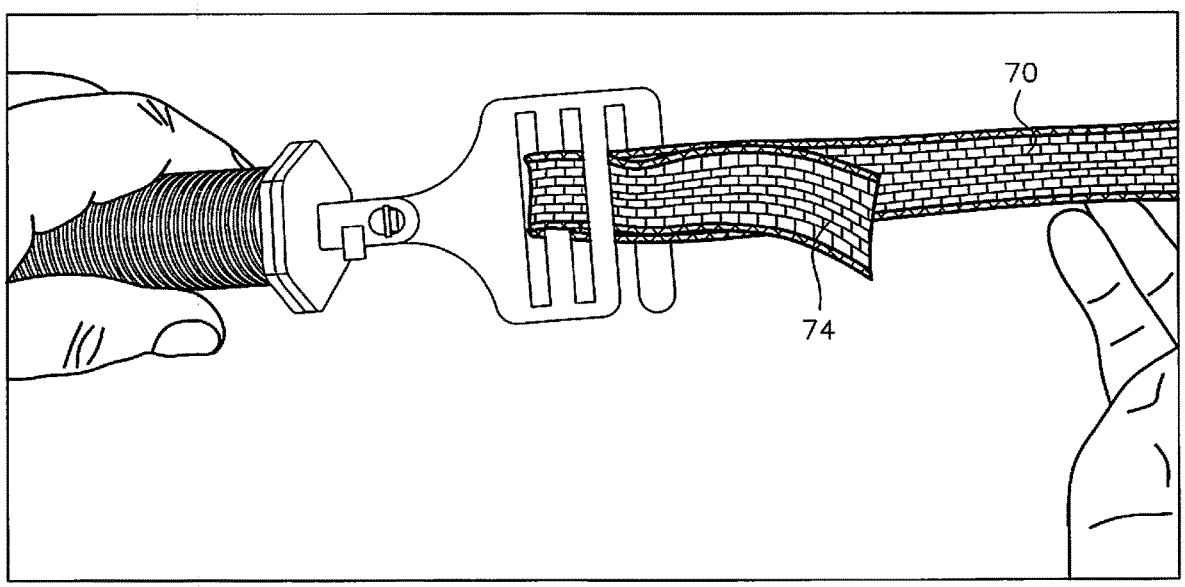
FIG. 12E shows the finished configuration following FIG. 12D, with both sections of the poly tape have been looped through the third slot and secured to the accessory according to the present invention.

The first step according to the method is to bring the free end 72 of the poly tape 70 up through the first slot 16 as shown in FIG. 12A. The free end 72 is then looped back down through the second slot 18 as shown in FIG. 12B, and then folded back upon itself in a layered relationship including an upper section 74 on top of a lower section 76 in the hand of the user 60 as shown in FIG. 12C. Both sections 74, 76 of the poly tape 70 are then brought into the third slot 20 through the open side 22 as shown in FIG. 12D. The poly tape 70 when secured to the accessory is shown in FIG. 12E.

The foregoing steps of weaving the poly tape through the slots serves to lock the poly tape and prevent it from pulling back out of the accessory while also allowing the overlapping sections of the poly tape to be adjusted within the accessory slots. For example, more of the lower portion may be drawn up through the accessory, effectively lengthening the upper section 74, to remove any excess slack in the poly rope fencing 70.

The poly tape electric fence gate handle accessory as described herein is user-friendly, inexpensive and easily installable and removable without tools, enabling the poly tape connection to be removed so that the gate handle can accommodate other styles of electric fencing. As shown, the accessory is compatible with poly tapes ranging from 0.500" to 2.000" in width, but other poly tape sizes could be accommodated through appropriate modification of the dimensions of the accessory slots.

The foregoing description and drawings should be considered as illustrative only of the principles of the invention. The invention may be configured in a variety of shapes and sizes and is not limited by the dimensions of the preferred embodiment. For example, the accessory may have more than three slots or may, if a suitable locking mechanism is provided, have only two slots. Therefore, it is not desired to limit the invention to the specific examples disclosed or the exact construction and operation shown and described. Rather, all suitable modifications and equivalents may be resorted to, falling within the scope of the invention.

What is claimed is:

1. A poly tape accessory for use with electric fencing comprising:
   a head with a plurality of slots formed therein; and
   a neck having a locating feature and a locking tab,
      the locating feature configured to engage with a complementary structure on an electric fence gate handle through a quarter-turn rotation of the poly tape accessory relative to the fence gate handle to removably couple the poly tape accessory to the fence gate handle, said accessory being electrically conductive, the locating feature includes a boss with a projecting end that is configured to be inserted through a complementary elongated hole in a connecting arm of the fence gate handle, the locking tab has a generally U-shaped arm extending from the neck; wherein
      following the quarter-turn, the locating feature is not removable from the elongated hole, and the locking tab engages the connecting arm to prevent lateral movement of the accessory relative to the fence gate handle.

2. The poly tape accessory as set forth in claim 1, wherein the projecting end has an enlarged head that fits through the elongated hole in a first orientation but is too large to fit back through the elongated hole after the accessory is rotated the quarter-turn to a second orientation.

3. The poly tape accessory as set forth in claim 2, wherein the enlarged head is T-shaped.

4. The poly tape accessory as set forth in claim 2, wherein the U-shaped arm forms an open-sided channel that receives the connecting arm of the fence gate handle when the accessory is rotated to the second orientation to prevent relative lateral movement between the accessory and the gate handle.

5. The poly tape accessory as set forth in claim 2, wherein the plurality of slots include two generally rectangular slots formed as cutouts in the head that are enclosed on all four sides by a perimeter of the head, and one generally rectangular open slot that is enclosed on three sides but open on a fourth side, the slots being configured to have a length of poly tape woven therethrough.

6. The poly tape accessory as set forth in claim 5, wherein the accessory is about 3.75 inches long and about 2.5 inches wide, and the slots are about 2.125 inches in length.

7. The poly tape accessory as set forth in claim 6, wherein the slots are about 0.200 inches wide.

8. The poly tape accessory as set forth in claim 2, wherein the U-shaped arm prevents rotation of the accessory beyond the quarter-turn to the second orientation.

9. The poly tape accessory as set forth in claim 1, wherein the accessory, once coupled to the fence gate handle, is removed from the fence gate handle through a quarter turn in a direction opposite the quarter turn rotation by which the accessory was coupled to the fence gate handle.

10. The poly tape accessory as set forth in claim 1, wherein the U-shaped arm has a free end that extends above and generally parallel with a base of the neck.

11. The combination of an electric fence gate handle and a poly tape accessory comprising:
    an electric fence gate handle including a fence closure end and a poly tape connecting end having a connecting arm with an elongated opening; and
    an electrically conductive poly tape accessory including a head with a plurality of slots formed therein and a neck having a locating feature and a locking tab, the locating feature including a boss having a projecting end with an enlarged head that is configured to be inserted through said elongated opening in the connecting arm of the gate handle in a first orientation and, upon thereafter rotating the accessory a quarter-turn to a second orientation, the enlarged head of the boss projecting end extending transversely to the elongated opening such that the enlarged head of the boss cannot be pulled back through the elongated opening in the gate handle connecting arm, thereby coupling the accessory to the gate handle, the locking tab has a generally U-shaped arm that forms a channel that receives the connecting arm of the fence gate handle in the second orientation to restrict relative lateral movement between the accessory and the gate handle.

12. The combination as set forth in claim 11, wherein the enlarged head is T-shaped.

13. The combination as set forth in claim 11, wherein the accessory, once coupled to the fence gate handle, is removed from the fence gate handle through a quarter turn back to the first orientation, allowing the enlarged head to be withdrawn through the elongated opening in the connecting arm of the gate handle.

14. The combination as set forth in claim 11, wherein the plurality of slots include two generally rectangular slots formed as cutouts in the head that are enclosed on all four sides by a perimeter of the head, and one generally rectangular open slot that is enclosed on three sides but open on a fourth side, the slots being configured to have a length of poly tape woven therethrough.

15. The combination as set forth in claim 14, wherein the slots are about 2.125 inches long and about 0.200 inches wide.

16. A method of securing a poly tape to an electrically conductive poly tape accessory, the poly tape accessory having a head with a plurality of slots formed therein and a neck having a locating feature and a locking tab, the slots including first and second generally rectangular closed slots formed as cutouts in the head that are enclosed on all four sides by a perimeter of the head, and one generally rectangular open slot that is enclosed on three sides but open on a fourth side, the closed slots are positioned between the neck and the open slot, the method comprising the steps of:
    bringing a free end of the poly tape up through the first closed slot;
    looping the free end of the poly tape back down through the second closed slot which is adjacent to the first closed slot so that the poly tape is folded back upon itself to form two sections having an overlap; and
    bringing the two sections of the poly tape into the open slot through the open fourth side thereof to lock the poly tape and prevent it from pulling back out of the accessory.

17. The method as set forth in claim 16, further comprising the step of adjusting the poly tape within the accessory slots to increase the overlap and thereby remove any excess slack in the fencing.

\* \* \* \* \*